US012278832B2

(12) United States Patent
Shah

(10) Patent No.: US 12,278,832 B2
(45) Date of Patent: Apr. 15, 2025

(54) DETECTING ANOMALOUS RESOURCES AND EVENTS IN SOCIAL DATA USING A TRAINED ANOMALY DETECTOR

(71) Applicant: Snap Inc., Santa Monica, CA (US)

(72) Inventor: Neil Shah, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 379 days.

(21) Appl. No.: 17/549,193

(22) Filed: Dec. 13, 2021

(65) Prior Publication Data

US 2022/0279001 A1 Sep. 1, 2022

Related U.S. Application Data

(63) Continuation of application No. 16/235,990, filed on Dec. 28, 2018, now Pat. No. 11,212,303.

(51) Int. Cl.
| | |
|---|---|
| *G06F 21/71* | (2013.01) |
| *H04L 9/40* | (2022.01) |
| *G06F 18/2411* | (2023.01) |
| *G06F 21/00* | (2013.01) |
| *G06Q 50/00* | (2012.01) |

(52) U.S. Cl.
CPC ...... *H04L 63/1433* (2013.01); *H04L 63/1425* (2013.01); *G06F 18/2411* (2023.01); *G06Q 50/01* (2013.01)

(58) Field of Classification Search
CPC . G06Q 50/01; G06F 18/2411; H04L 63/1425; H04L 63/1433
USPC .......................................................... 726/25
See application file for complete search history.

(56) References Cited

U.S. PATENT DOCUMENTS

| | | | | |
|---|---|---|---|---|
| 6,151,022 A | * | 11/2000 | Alshibani | G06F 9/454 |
| | | | | 715/788 |
| 8,140,615 B2 | * | 3/2012 | Miller | G06Q 10/06 |
| | | | | 709/202 |
| 8,700,762 B2 | * | 4/2014 | Donadio | H04L 41/0253 |
| | | | | 709/224 |

(Continued)

FOREIGN PATENT DOCUMENTS

| | | | | |
|---|---|---|---|---|
| AU | 2018338684 A1 | * | 4/2020 | G01N 33/18 |
| CN | 104244307 A | | 12/2014 | |

(Continued)

OTHER PUBLICATIONS

"U.S. Appl. No. 16/235,990, Examiner Interview Summary mailed May 10, 2021", 2 pgs.

(Continued)

*Primary Examiner* — Haresh N Patel
(74) *Attorney, Agent, or Firm* — Schwegman Lundberg & Woessner, P.A.

(57) ABSTRACT

Systems, devices, media and methods are presented for detecting anomalous resources and events in social data. The systems and methods receive a plurality of events associated with a plurality of resources, wherein the plurality of events includes a plurality of features. The systems and methods detect a set of anomalous resources from the plurality of resources and identify a set of anomalous events associated with the set of anomalous resources. The systems and methods cause an interface to be displayed on a computing device, wherein the interface includes the set of anomalous resources and the set of anomalous events.

20 Claims, 10 Drawing Sheets

(56) References Cited

U.S. PATENT DOCUMENTS

| | | | |
|---|---|---|---|
| 9,887,995 B2* | 2/2018 | Rotter | H04W 12/06 |
| 10,397,236 B1* | 8/2019 | Chadha | G06F 11/3476 |
| 10,459,938 B1* | 10/2019 | Agnew | G06F 3/0482 |
| 10,545,817 B2* | 1/2020 | Cosgrove | G06F 11/3409 |
| 10,581,886 B1* | 3/2020 | Sharifi Mehr | H04L 63/1441 |
| 10,671,726 B1* | 6/2020 | Paithane | H04L 63/1416 |
| 10,891,372 B1* | 1/2021 | Shahbazi | H04L 63/0815 |
| 11,212,303 B1 | 12/2021 | Shah | |
| 11,637,844 B2* | 4/2023 | Shenoy | H04W 12/67 726/23 |
| 11,663,508 B1* | 5/2023 | Quach | B60W 30/18154 706/52 |
| 2007/0083915 A1* | 4/2007 | Janakiraman | G06F 21/6218 726/4 |
| 2008/0306931 A1* | 12/2008 | Brower | G06Q 30/02 707/999.005 |
| 2013/0169666 A1* | 7/2013 | Pacheco | G06F 11/323 345/593 |
| 2014/0283026 A1 | 9/2014 | Striem Amit et al. | |
| 2015/0347214 A1 | 12/2015 | Samuni et al. | |
| 2016/0352762 A1* | 12/2016 | Friedlander | H04L 63/1425 |
| 2016/0359713 A1* | 12/2016 | Shi | H04L 43/04 |
| 2017/0147383 A1 | 5/2017 | Hudzia et al. | |
| 2017/0195994 A1* | 7/2017 | Cole | G06Q 20/326 |
| 2018/0183823 A1* | 6/2018 | Fadlil | G06F 11/00 |
| 2018/0336353 A1* | 11/2018 | Manadhata | G06F 16/3334 |
| 2019/0026459 A1 | 1/2019 | Harutyunyan et al. | |
| 2019/0075168 A1* | 3/2019 | Goldfarb | H04L 63/0272 |
| 2019/0213099 A1* | 7/2019 | Schmidt | G06N 3/044 |
| 2019/0213266 A1* | 7/2019 | Sathya | G06F 16/9537 |
| 2019/0236177 A1* | 8/2019 | Jain | G06F 16/2365 |
| 2019/0342195 A1* | 11/2019 | Mermoud | G06N 3/049 |
| 2019/0354388 A1* | 11/2019 | Mitra | G06N 20/00 |
| 2020/0110946 A1* | 4/2020 | Kline | G06V 40/10 |
| 2020/0125471 A1* | 4/2020 | Garvey | G06F 18/217 |
| 2020/0145304 A1* | 5/2020 | Wulff | H04L 43/045 |

FOREIGN PATENT DOCUMENTS

| | | | | |
|---|---|---|---|---|
| CN | 109242246 B | * | 5/2021 | G06K 9/6218 |
| CN | 109196887 B | * | 9/2021 | G08G 1/096883 |
| EP | 3163445 A1 | * | 5/2017 | G06F 11/0709 |
| JP | 6981063 B2 | * | 12/2021 | G06F 11/3051 |
| KR | 102339239 B1 | * | 10/2018 | |

OTHER PUBLICATIONS

"U.S. Appl. No. 16/235,990, Non Final Office Action mailed Jan. 6, 2021", 10 pgs.

"U.S. Appl. No. 16/235,990, Notice of Allowance mailed Aug. 23, 2021", 7 pgs.

"U.S. Appl. No. 16/235,990, Response filed May 6, 2021 to Non Final Office Action mailed Jan. 6, 2021", 11 pgs.

Beutel, Alexis, et al., "CopyCatch: Stopping Group Attacks by Spotting Lockstep Behavior in Social Networks", Proc. of the 22nd Intl. Conference on World Wide Web, (2013), 11 pgs.

Buczak, Anna L., et al., "A Survey of Data Mining and Machine Learning Methods for Cyber Security Intrusion Detection", IEEE Communications Surveys & Tutorials vol. 18, Issue 2, (2016), 24 pgs.

Buragohain, Chiranjeeb, et al., "Quantiles on Streams", Encyclopedia of Database Systems, Springer, (2009), 5 pgs.

Cao, Quiang, et al., "Uncovering Large Groups of Active Malicious Accounts in Online Social Networks", Proc.of the ACM SIGSAC Conference on Computer and Communications Security, (2014), 12 pgs.

Chau, Horng P, et al., "Polonium: Tera-Scale Graph Mining and Inference for Malware Detection", Proc. of the SIAM Intl. Conference on Data Mining, (2011), 12 pgs.

Chen, Liang, et al., "Analysis and Detection of Fake Views in Online Video Services", ACM Transactions on Multimedia Computing, Communications, and Applications (TOMM) vol. 11, Issue 2s, (Feb. 2015), 20 pgs.

Cormode, Graham, et al., "An improved data stream summary: the count-min sketch and its applications", Journal of Algorithms 55(1), (2004), 18 pgs.

Cormode, Graham, et al., "Holistic UDAFs at Streaming Speeds", Proc. of the ACM SIGMOD Intl. Conference on Management of Data, (2004), 12 pgs.

Faloutsos, Michalis, et al., "On Power-Law Relationships of the Internet Topology", ACM SIGCOMM Computer Communication Review, vol. 29, (1999), 12 pgs.

Freeman, David Mandell, "Using Naive Bayes to Detect Spammy Names in Social Networks", Proc. of the ACM Workshop on Artifical Intelligence and Security (AISec), (Nov. 4, 2013), 23 pgs.

Giatsoglou, Maria, et al., "ND-SYNC: Detecting Synchronized Fraud Activities", Pacific-Asia Conference on Knowledge Discovery and Data Mining, Springer, (2015), 12 pgs.

Giatsoglou, Maria, et al., "Retweeting Activity on Twitter: Signs of Deception", Pacific-Asia Conference on Knowledge Discovery and Data Mining, Springer, (2015), 12 pgs.

Guacho, Gisel Bastidas, et al., "Semi-supervised Content-based Detection of Misinformation via Tensor Embeddings", arXiv:1804.09088v1, (Apr. 24, 2018), 8 pgs.

Ho, Grant, et al., "Detecting Credential Spearphishing Attacks in Enterprise Settings", Proc. of the 26th USENIX Security Symposium, Vancouver, BC, (Aug. 2017), 19 pgs.

Hooi, Bryan, et al., "BIRDNEST: Bayesian Inference for Ratings-Fraud Detection", Proc of the SIAM Intl. Conference on Data Mining; arXiv:1511.06030v2, (2016), 9 pgs.

Hooi, Bryan, et al., "FRAUDAR: Bounding Graph Fraud in the Face of Camouflage", Proc. of the 22nd ACM SIGKDD Intl. Conference on Knowledge Discovery and Data Mining, (Aug. 2016), 10 pgs.

Jiang, Meng, et al., "Spotting Suspicious Behaviors in Multimodal Data: A General Metric and Algorithms", IEEE Transactions on Knowledge and Data Engineering, vol. 28, No. 8, (Aug. 2016), 14 pgs.

Kumar, Srijan, et al., "False Information onWeb and Social Media: A Survey", arXiv:1804.08559v1, (Apr. 23, 2018), 35 pgs.

Kumar, Srijan, et al., "VEWS: A Wikipedia Vandal Early Warning System", Proc. of the 21st ACM SIGKDD Intl. Conference on Knowledge Discovery and Data Mining; arXiv:1507.01272v1, (Jul. 5, 2015), 10 pgs.

Liu, Fei Tony, et al., "Isolation Forest", 8th IEEE Intl. Conference on Data Mining, (2008), 10 pgs.

Newman, M. E.J., "Power laws, Pareto distributions and Zipf's law", Contemporary Physics 46(5); arXiv:cond-mat/0412004v3, (May 29, 2006), 28 pgs.

O'Donoghue, Brendan, et al., "Conic Optimization via Operator Splitting and Homogeneous Self-Dual Embedding", Journal of Optimization Theory and Applications 169(3); arXiv:1312.3039v2, (Jul. 25, 2016), 24 pgs.

Pandit, Shashank, et al., "NetProbe: A Fast and Scalable System for Fraud Detection in Online Auction Networks", Proc. of the 16th Intl. Conference on World Wide Web, (2007), 10 pgs.

Peng, Tao, et al., "Proactively Detecting Distributed Denial of Service Attacks U sing Source IP Address Monitaring", Networking: Intl. Conference on Research in Networking, (2004), 12 pgs.

Rayana, Shebuti, et al., "Collective Opinion Spam Detection: Bridging Review Networks and Metadata", Proc. of the 21st ACM SIGKDD Intl. Conference on Knowledge Discovery and Data Mining, Sydney, NSW, AU, (Aug. 2015), 10 pgs.

Shah, Neil, et al., "EdgeCentric: Anomaly Detection in Edge-Attributed Networks", IEEE 16th Intl. Conference on Data Mining Workshops (ICDMW), Barcelona, Spain, (Dec. 2016), 8 pgs.

Shah, Neil, "FLOCK: Combating Astroturfing on Livestreaming Platforms", Proc. of the 26th Intl. Conference on World Wide Web, Perth, AU, (Apr. 2017), 9 pgs.

Shah, Neil, et al., "The Many Faces of Link Fraud", IEEE International Conference on Data Mining (ICDM), New Orleans, LA, USA, (Sep. 2017), 19 pgs.

Shah, Neil, et al., "TimeCrunch: Interpretable Dynamic Graph Summarization", Proc. of the 21st ACM SIGKDD Intl. Conference on Knowledge Discovery and Data Mining, Sydney, NSW, Australia, (Aug. 2015), 10 pgs.

(56) References Cited

OTHER PUBLICATIONS

Shin, Kijung, et al., "M-Zoom: Fast Dense-Block Detection in Tensors with Quality Guarantees", ECML PKDD European Conference on Machine Learning and Knowledge Discovery in Databases—vol. 9851, (2016), 16 pgs.

Stringhini, Gianluca, et al., "Evilcohort: Detecting Communities of Malicious Accounts on Online Services", Proc. of the 24th USENIX Security Symposium, Washington, D.C., (Aug. 2015), 17 pgs.

Thomas, Kurt, et al., "Consequences of Connectivity: Characterizing Account Hijacking on Twitter", Proc. of the ACM SIGSAC Conference on Computer and Communications Security, Scottsdale, AZ, USA, (2014), 12 pgs.

Thomas, Kurt, et al., "Trafficking Fraudulent Accounts: The Role of the Underground Market in Twitter Spam and Abuse", Proc. of the 22nd USENIX Security Symposium, Washington, D.C., USA, (Aug. 2013), 17 pgs.

Thottan, Marina, et al., "Anomaly Detection in IP Networks", IEEE Transactions on Signal Processing, vol. 51, No. 8, (Aug. 2003), 14 pgs.

Vitter, Jeffrey Scott, "Random Sampling with a Reservoir", ACM Transactions on Mathematical Software, 11(1), (Mar. 1985), 37-57.

Xiao, Cao, "Detecting Clusters of Fake Accounts in Online Social Networks", Proc. of the 8th ACM Workshop on Artificial Intelligence and Security, Denver, CO, USA, (Oct. 2015), 11 pgs.

Xing, Eric P, et al., "Distance Metric Learning, with Application to Clustering with Side-Information", Advances in Neural Information Processing Systems 15, (2002), 8 pgs.

\* cited by examiner

DETECTING ANOMALOUS RESOURCES AND EVENTS IN SOCIAL DATA USING A TRAINED ANOMALY DETECTOR

CLAIM OF PRIORITY

This application is a continuation of U.S. patent application Ser. No. 16/235,990, filed on Dec. 28, 2018, now U.S. Pat. No. 11,212,303, which is incorporated herein by reference in its entirety.

TECHNICAL FIELD

Embodiments of the present disclosure relate generally to social network security and privacy. More particularly, but not by way of limitation, the present disclosure addresses systems and methods for detecting abusive behavior on online social platforms.

BACKGROUND

The prevalence of abusive behavior on online social platforms has risen considerably in recent years. As social platforms become increasingly omnipresent communication and information sharing platforms, bad actors are incentivized to engage in abusive behaviors for profit on behalf of personal or corporate interests for gain. These behaviors can include account creation efforts, social spam by propagating content over a network, account hijacking efforts for purposes of humiliation or exploitation, and more. As a result, the broader research community has invested substantial resources on tackling a wide variety of mis-behavior problems spanning applications such combating e-mail phishing attacks, malware detection, network intrusion, livestreaming abuse, social and content spam, fake account registration, account compromise and many more.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One aspect of the present disclosure describes a system for detecting anomalous resources and anomalous events. The system provides an unsupervised approach for a resource-based anomaly detection problem, where resources represent fixed constraints for bad actors. Resource constraints may be for example IP addresses or computer devices.

For example, given an event-log, where each event has at least one numerical, categorical or textual feature and is associated with a resource, the system detects the anomalous resources and identifies corresponding anomalous events. Large-scale online systems typically log events which relevant features, which are triggered by certain application actions such as button clicks, form actions, and application flows. Over time, these event-logs grow with increasing activity.

This event-log can be a multiset E of event tuples where each tuple ea E supp($F_1$)×supp($F_2$)× . . . supp($F_d$), given descriptive event feature spaces $F_1$ . . . $F_d$. We consider that the instances of event features, $f_1$ . . . $f_d$ are categorical, numerical or textual. Moreover, each $e_i$ is associated with a timestamp $T(e_i)$ and a resource identifier $R(e_i) \in R$. The system may consider any identifier type such as IP addresses, or client devices.

Figure 1:
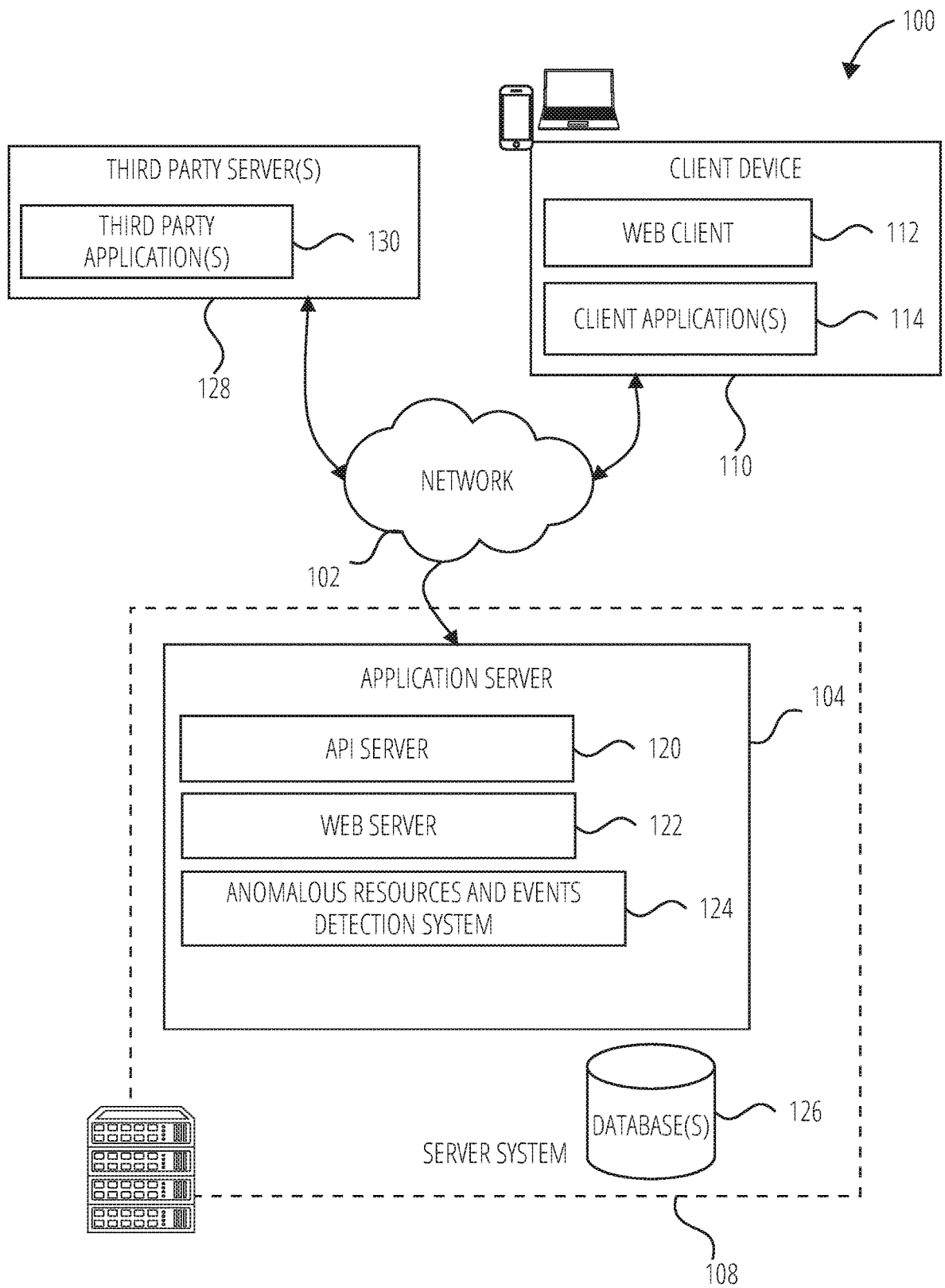
FIG. 1 is a block diagram showing an example malware detection system over a network.

Second, given a set of anomalous resources, $R_A$ and associated candidate set $C=\{e \in \varepsilon | R(e) \in R_A\}$, identify the suspected culpable events $\varepsilon_A \in C$. Details of the anomalous resources and events detection system are provided below, FIG. 1 is a block diagram illustrating a system 100, according to some example embodiments, configured to automatically detect an abusive entity (e.g., a user). The system 100 includes one or more client devices such as client device 110, The client device 110 comprises, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, send spam by propagating content over a network 104, hijack an existing account for purposes of humiliation or exploitation, and so forth.

For example, client device 110 is a device of a given user who would like to create an account on an online social platform. Client device 110 accesses a website of an online social platform (e.g., hosted by server system 108). The user inputs login credentials associated with the user. Server system 108 receives the request and provides access to the online social platform.

As another example, client device 110 is a device of a given abusive user who would like to compromise an existing account for purposes of abusive behavior. Client device 110 accesses a website of the online social platform (e.g., hosted by server system 108). The abusive user repeatedly attempts to input login credentials for the existing account. Server system 108 receives the repeated abusive user inputs and automatically identifies the client device 110 of the abusive user as an anomalous resource. Server system 108 also identifies the login attempts by the abusive user as an anomalous event. Server system 108 blocks the abusive user from accessing the online social platform.

One or more users may be a person, a machine, or other means of interacting with the client device 110. In example embodiments, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 104. In this instance, the other entities in the system 100, in response to receiving the input from the user, may communicate information to the client device 110 via the network 104 to be presented to the user. In this way, the user interacts with the various entities in the system 100 using the client device 110.

The system 100 further includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online home buying and selling application, a real estate application, and the like.

In some embodiments, one or more client application(s) 114 are included in a given one of the client device 110, and configured to locally provide the user interface and at least some of the functionalities, with the client application(s) 114 configured to communicate with other entities in the system 100 (e.g., third-party third party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party third party server(s) 128, server system 108, etc.

A server system 108 provides server-side functionality via the network 104 (e.g., the Internet or wide area network (WAN)) to: one or more third party server(s) 128, and one or more client devices 110. The server system 108 includes an application program interface (API) server 120, a web server 122, and an anomalous resources and events detection system 124, that may be communicatively coupled with one or more database(s) 126. The one or more database(s) 126 may be storage devices that store data related to users of the server system 108, applications associated with the server system 108, cloud services, housing market data, and so forth. The one or more database(s) 126 may further store information related to third party server(s) 128, third-party third party application(s) 130, client device 110, client application(s) 114, users, and so forth. In one example, the one or more database(s) 126 may be cloud-based storage.

The server system 108 may be a cloud computing environment, according to some example embodiments. The server system 108, and any servers associated with the server system 108, may be associated with a cloud-based application, in one example embodiment.

The server system 108 includes an anomalous resources and events detection system 124. Anomalous resources and events detection system 124 may include one or more servers and may be associated with a cloud-based application. Anomalous resources and events detection system 124 may obtain user information associated with an online social platform from database(s) 126. The anomalous resources and events detection system 124 monitors social event-log data and identifies anomalous resources and events. The details of the anomalous resources and events detection system 124 are provided below in connection with FIG. 2.

The system 100 further includes one or more third party server(s) 128. The one or more third-party third party server(s) 128 may include one or more third party application(s) 130. The one or more third party application(s) 130, executing on third party server(s) 128 may interact with the server system 108 via API server 120 via a programmatic interface provided by the API server 120, For example, one or more the third-party applications 132 may request and utilize information from the server system 108 via the API server 120 to support one or more features or functions on a website hosted by the third party or an application hosted by the third party. The third party application(s) 130, for example, may provide software version analysis functionality that is supported by relevant functionality and data in the server system 108.

Figure 2:
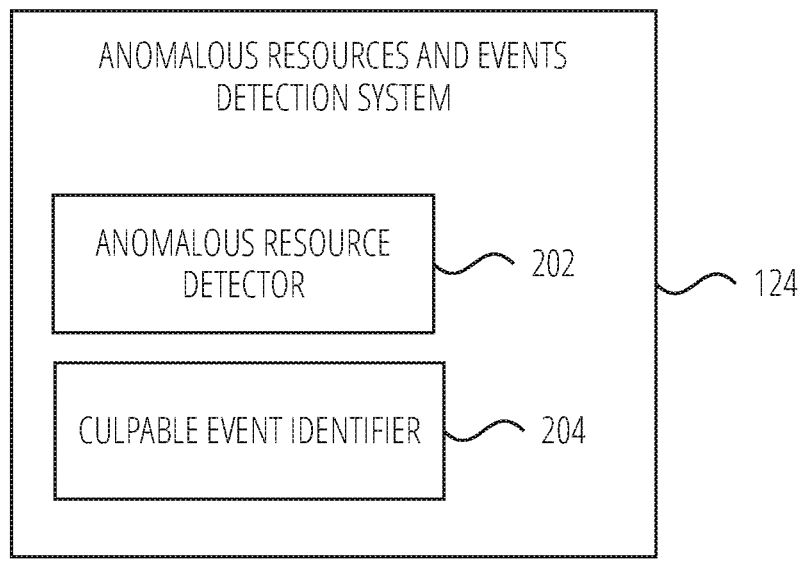
FIG. 2 is a block diagram illustrating a anomalous resources and events detection system, according to an example embodiment.
Figure 3:
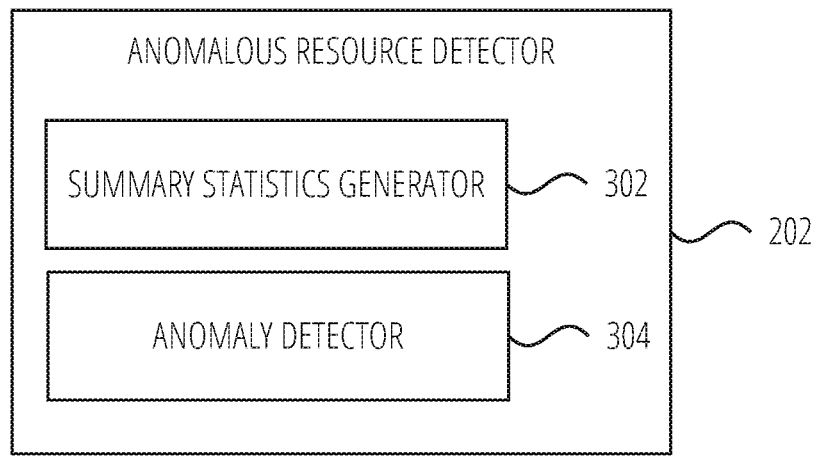
FIG. 3 is a block diagram illustrating a anomalous resources and events detection system, according to an example embodiment.
Figure 4:
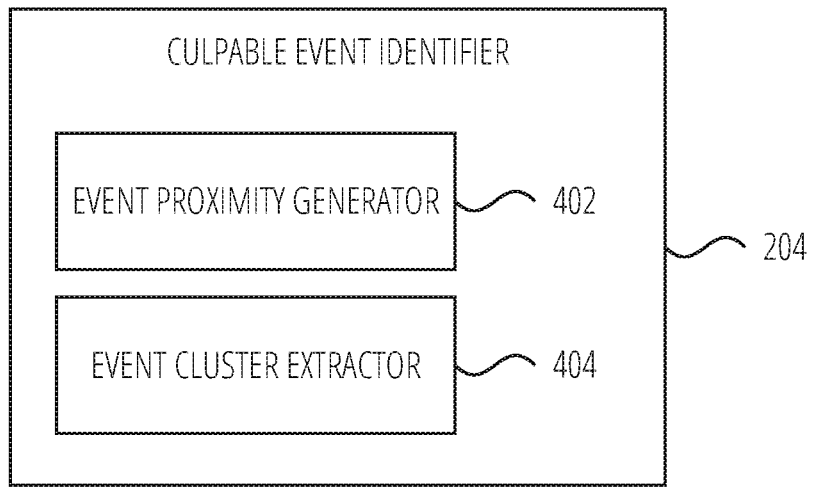
FIG. 4 is a block diagram illustrating a anomalous resources and events detection system, according to an example embodiment.

FIG. 2 is a block diagram illustrating an anomalous resources and events detection system 124. The anomalous resources and events detection system 124 includes the anomalous resource detector 202 and the culpable event identifier 204. As shown in FIG. 3, the anomalous resource detector 202 can include the summary statistics generator 302 and anomaly detector 304. Further, as shown in FIG. 4, the culpable event identifier 204 can include an event proximity generator 402 and an event cluster extractor 404.

Figure 9:
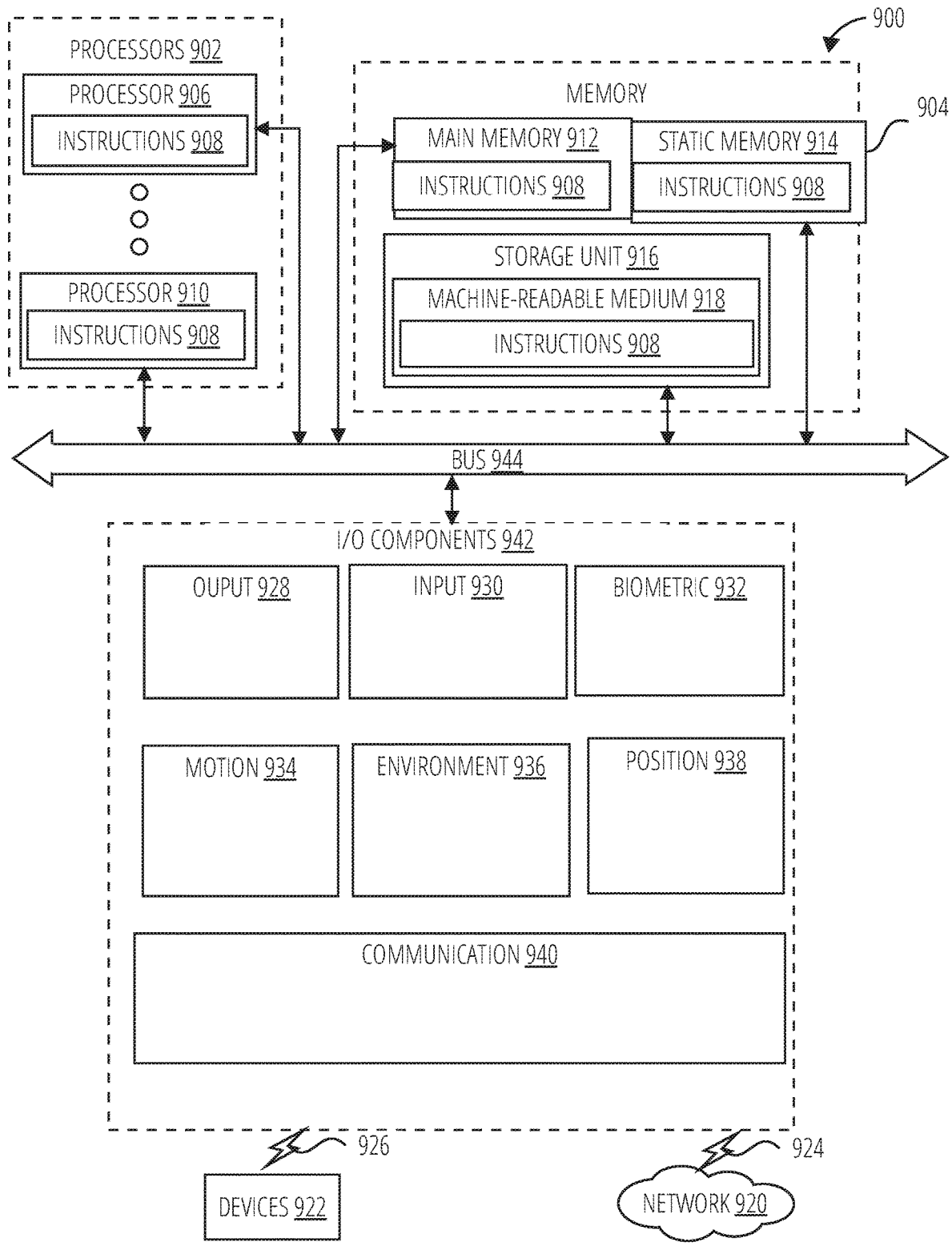
FIG. 9 is a diagrammatic representation of a machine in the form of a computer system within which a set of instructions may be executed for causing the machine to perform any one or more of the methodologies discussed herein, in accordance with some example embodiments.

Although the following flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in: FIG. 1, and FIG. 9.

Figure 5:
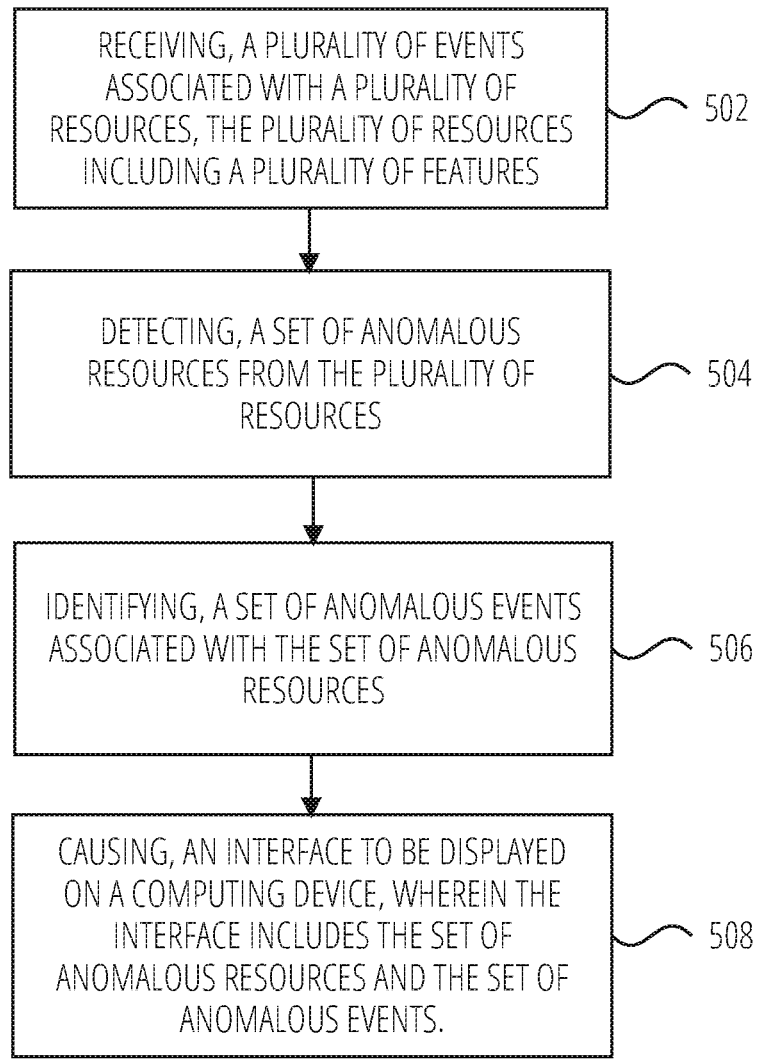
FIG. 5 is a flow diagram illustrating an example method for finding anomalous resources and events in social data, according to some example embodiments.

FIG. 5 is a flow diagram illustrating an example method for finding anomalous resources and events in social data, according to some example embodiments.

In FIG. 5, the method 500 starts with the anomalous resources and events detection system 124 receiving an event-log $\varepsilon$, composed of a stream of events $e_i=(f(_{i,1}), f(_{i,2}) \ldots f(_{i,d}))$ from resource $R(e_i)$ at a time $T(e_i)$ at operation 502. In some embodiments, the anomalous resource detector 202 receives the event-log $\varepsilon$ in operation 502. At operation 504, the anomalous resource detector 202 detects a set of anomalous resources $R_A$ from the rest of the resources.

Figure 6:
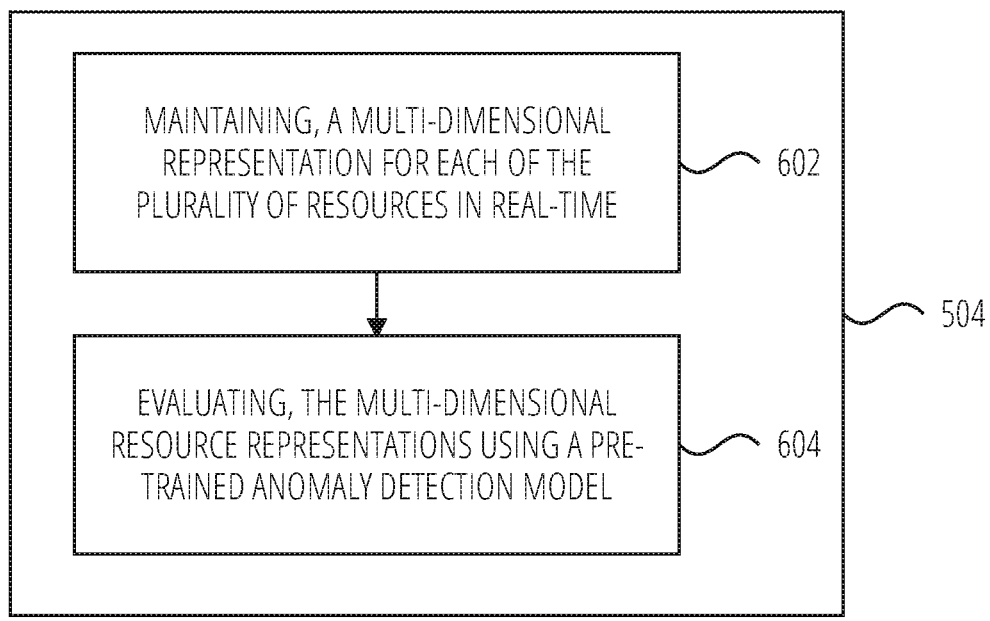
FIG. 6 is a flow diagram illustrating an example method for detecting a set of anomalous resources (operation 504 in FIG. 5) in the method for finding anomalous resources and events in social data, according to some example embodiments.

FIG. 6 is a flow diagram illustrating an example method for detecting a set of anomalous resources $R_A$ (operation 504 in FIG. 5) in the method for finding anomalous resources and events in social data, according to some example embodiments. As shown in FIG. 6, to detect the anomalous resources $R_A$, at operation 602, the anomalous resource detector 202 uses the summary statistics generator 302 to maintain multi-dimensional representations of the resources, in real-time. The multi-dimensional representations are resource-level summary statistics of the event-level features (e.g., categorical, textual, or numerical features) associated with each resource's events.

Specifically, each resource $r_i$ is represented with an ensemble of resource-level statistics on event-level features $f(_{i,1}) \ldots f(_{i,d})$ of the associated events $\{e_i | R(e_i)=_i\}$, such that the resulting resource-level representation is a multi-dimensional representation. The event-level features may represent various aspects of social data including login status, username, etc. The summary statistics model 302 may extract any number of summary statistics from even a single event-level feature.

In general, the summary statistics generator 302 generates predefined summary statistics that are based on each of the event-level features (e.g., categorical, textual, or numerical features). In one example embodiment, the summary statistics model 302 selects only particular summary statistics in order to account for heavily skewed data (e.g. resources that generate a high number of events). For example, for numerical features, possible summary statistics include extrema (e.g. minimum, maximum), moments (e.g. mean, variance), and quantile statistics. For categorical features, possible summary statistics include inequality statistics (e.g. entropy, Gini score), distinct-value statistics (e.g. proportion of unique values), and frequency-based statistics (e.g. proportions of first and second most-frequent elements). Finally, for textual features, possible summary statistics include encoding patterns, text length, counts of unique strings over a set of strings.

The summary statistics generator 302 maintains and computes the multi-dimensional resource-level representations (e.g. summary statistics) for all of the resources associated with the events in the event-log. The summary statistics generator 302 uses reservoir sampling to compute numerical data (e.g. quantile statistics). For categorical data, the summary statistics generator 302 maintains hashmaps of unique elements and seen counts, while maintaining a separate counter for total seen elements. In one example embodiment, given a size-n sample from a feature with a categorical distribution P over j categories, the expected number of unique elements u can be computed by the following equation:

$$\Sigma_{i=1}^{j} 1-(1-p_i)^n$$

wherein $p_i$ denotes the probability mass on the $i^{th}$ category of P.

Referring hack to FIG. 6, at operation 604, the anomalous resource detector 202 leverages the anomaly detector 304 to identify the anomalous resources. The anomaly detector 304 can be a trained unsupervised anomaly detection model that identifies the anomalous resources.

In one embodiment, the anomaly detector 304 evaluates the multi-dimensional resources representations using a pre-trained windowed anomaly detection model. The anomaly detector 304 partitions the stream of events in the event-log into consecutive and non-overlapping time-windows, such that detection on a current window depends on a detector built from a prior window. Thus, at any given time, the anomaly detector 304 is concerned with two subsets of the event stream: the reference window and the current window. The anomaly detector 304 is thus trained on the reference window and utilized for the current window. Furthermore, the anomaly detector 304 sets a minimum event threshold and evaluates resources with a minimum number of events. Second, the anomaly detector 304 introduces stochasticity into the step such each resource is evaluated with an evaluation probability, thus avoiding frequent evaluations for high event-count resources and proportionally reducing runtime by inducing a stochastic delay in evaluation. In one example embodiment, given n events across m resources $r_1 \ldots r_m$, an event count $|\varepsilon(r_i)| \sim P$, an event count evaluation threshold r and a probability $p_{eval}$, the expected ratio of evaluated events to total events can be represented by the following equation:

$$\mathbb{E}[n_{eval}] = n^{-1} \cdot m \cdot p_{eval} \cdot \sum_{k=\tau}^{K}[p_k \cdot (k-\tau+1)]$$

where $K=\max(\mathrm{supp}(P))$ and $p_k$ is the fraction of k-event resources, such that $|\varepsilon(r_i)|=k$.

Referring back to FIG. 5, at operation 506, the culpable event identifier 204 identifies a set of anomalous events associated with the set of anomalous resources previously detected at operation 504. The culpable event identifier 204 can incorporate learning of a between-event distance metric which obeys human intuitions regarding feature importance and produces coherent clusters of suspected events which are excessively similar.

Figure 7:
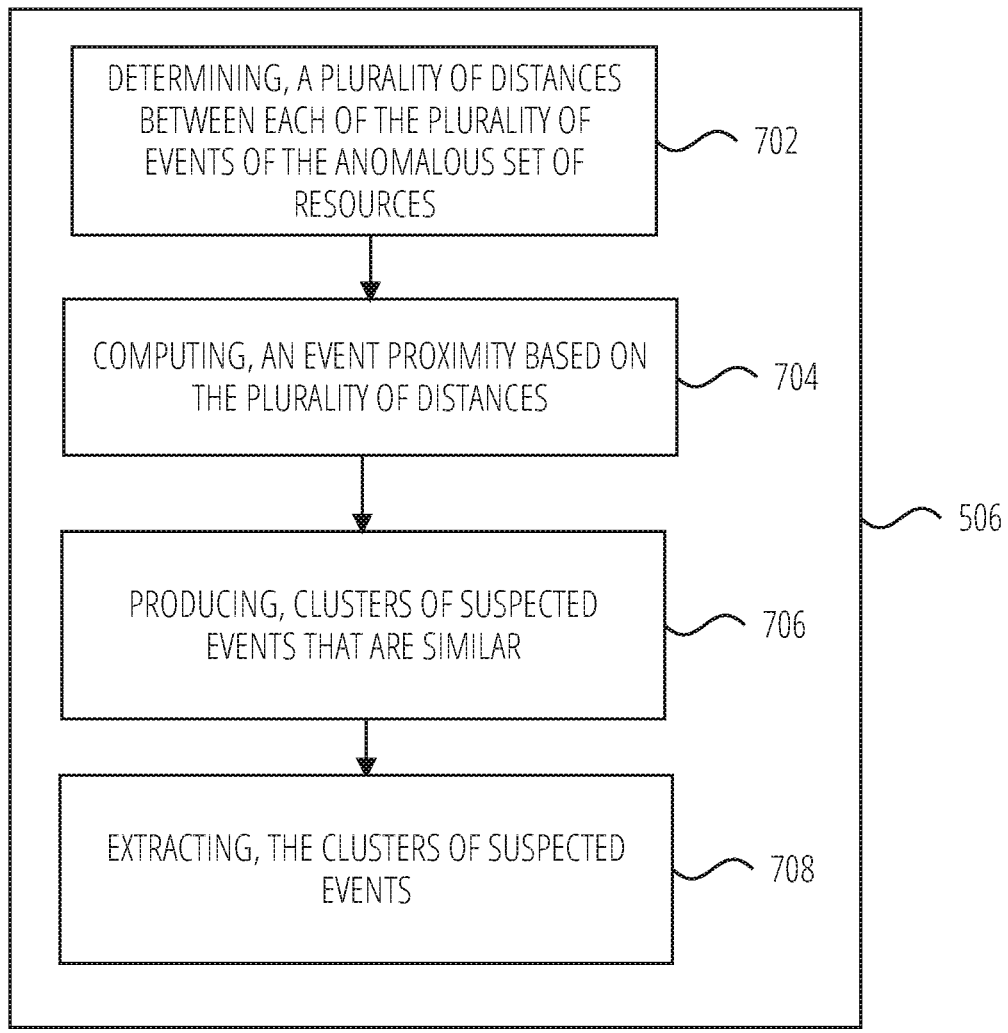
FIG. 7 is a flow diagram illustrating an example method for identifying a set of anomalous events (operation 506 in FIG. 5) in the method for finding anomalous resources and events in social data, according to some example embodiments.

FIG. 7 is a flow diagram illustrating an example method for identifying a set of anomalous events (operation 506 in FIG. 5) in the method for finding anomalous resources and events in social data, according to some example embodiments.

In order to identify the set of anomalous events, the culpable event identifier 204 first, at operation 702, uses the event proximity generator 402 to determine the distances between each of the events within the set of the anomalous resources. The first goal of the event proximity generator 402 is to devise a measure of distance between events, and next define a means of inferring feature weights. Devising a measure of distance between events involves quantifying distances given arbitrary event schemas including numerical, categorical or textual features. In one example embodiment, wherein two events have feature values $a_i$, $b_i$, quantifying distances across each feature type may be represented by the following:

Numerical features: $\frac{|a_i - b_i|}{1 + |a_i - b_i|}$

Categorical features: $a_i \neq b_i$

Textual features: $1 - \frac{|a_i \cap b_i|}{|a_i \cup b_i|}$

Inferring feature weights is essential in computing the event proximity because in the case of a login event, event features such as username or login status may be most important, while in the case of a registration event, the most important event features may depend on birthdate and email domain.

In one example embodiment, the event proximity generator 402 at operation 704, computes the event proximity by inferring feature weights. The feature weights are inferred by minimizing distance between input sets of similar events (S), and maximizing distance between input sets of dissimilar events (D) by the following:

$$\min_{W} \sum_{(e_i,e_j) \in S} \Delta_W(e_i, e_j)^2 - \gamma \log \left( \sum_{(e_i,e_j) \in D} \Delta_W(e_i, e_j) \right) + \beta \|W\|_F$$

subject to $W \geq 0$

The above formulation can be adjusted by tuning $\gamma$ to increase weight of maximizing dissimilarity and tuning $\beta$ to avoid over-reliance on single features. From the inferred metric $\Delta w$, the event proximity generator 402 can define the following similarity function:

$\sigma_w = 1 - \Delta_w$

At operation 706, given the similarity function above, the event cluster extractor 404 included in the culpable event identifier 204 can produce clusters of suspected events that are similar. The event cluster extractor 404 can construct a cross-event similarity graph where an edge between events indicates their similarity. Upon constructing such a graph for each anomalous resource, the event cluster extractor 404 at operation 708, applies a subgraph-mining algorithm to extract coherent clusters in which each event in the cluster has a predefined similarity to at least one other event. The predefined similarity is an empirically tuned parameter which controls clustering aggressiveness.

Figure 8:
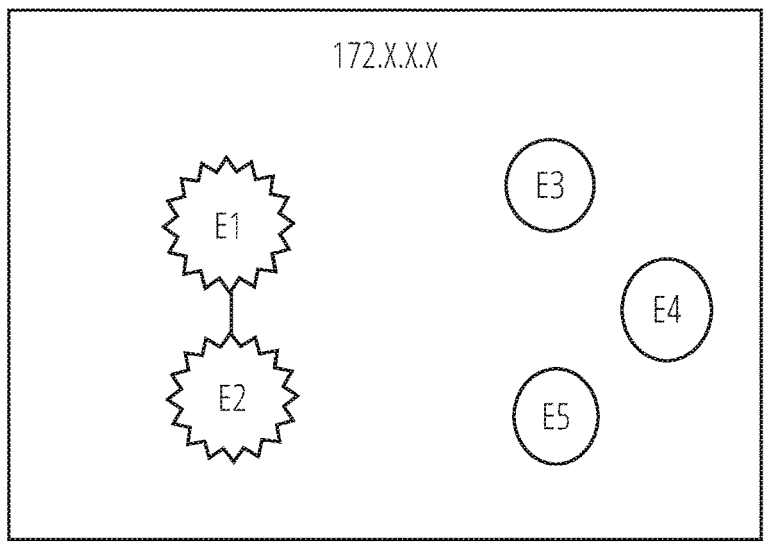
FIG. 8 is a diagrammatic illustration of an event cluster, according to an example embodiment.

FIG. 8 is a diagrammatic illustration representing an event cluster 800. Each cluster corresponds to the signature of a synchronized attack. For example, a resource (e.g. IP address) might have clusters (e.g. connected components E1 and E2) where each of the components denotes a different "attack" or type of abusive behavior.

Turning back to FIG. 5, at operation 504, the anomalous resources and events detection system 124 may cause an interface to be displayed on a computing device, wherein the interface includes the set of anomalous resources and events. In another example embodiment, the anomalous resources and events detection system 124 may target anomalous resources by activating rate-limits, issuing human verification challenges; or other problem specific challenges such as multi-factor authentication and validation for logins and registrations. In another example embodiment, the anomalous resources and events detection system 124 may target anomalous events by reversing event-triggered actions such as fraudulent account creation. 100521 FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example; the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone; a smart phone; a mobile device, a wearable device (e.g., a smart watch), a smart home device (e.g., a smart appliance), other smart devices; a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse; a touchpad, a trackball; a joystick, a motion sensor, or another pointing instrument), tactile input components (e.g., a physical button, a touch screen that provides location; force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature; perspiration, or brain waves); identify a person (e.g., voice identification, retinal identification, facial identification, fingerprint identification, or electroencephalogram-based identification); and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g.; barometer), acoustic sensor components (e.g., one or more microphones that detect background noise), proximity sensor components (e.g., infrared sensors that detect nearby objects), gas sensors (e.g.; gas detection sensors to detection concentrations of hazardous gases for safety or to measure pollutants in the atmosphere), or other components that may provide indications, measurements; or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
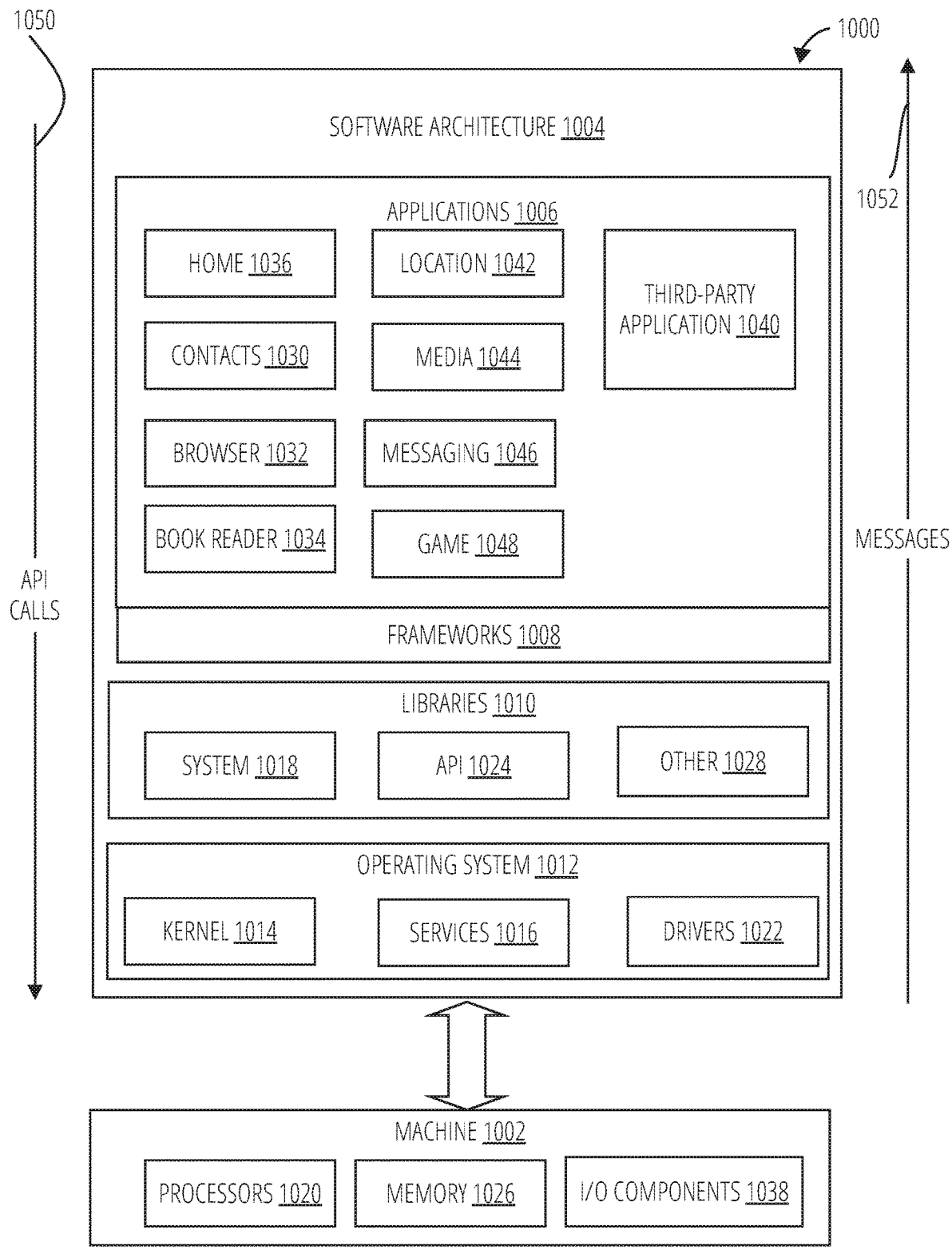
FIG. 10 is block diagram showing a software architecture within which the present disclosure may be implemented, in accordance with example embodiments.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

in an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

What is claimed is:

1. A method comprising:
   receiving, by a processor, a plurality of events associated with a plurality of resources;
   computing, in real-time, statistical representations for each resource associated with at least one of the plurality;
   generating a reference window comprising a first portion of the plurality of events and a current window comprising a second portion of the plurality of events;
   training an anomaly detector on the reference window using the statistical representations of resources in the first portion of the plurality of events;
   evaluating, by the trained anomaly detector, the current window using the statistical representations of resources in the second portion of the plurality of events to identify a set of anomalous resources;
   identifying a set of anomalous events associated with the set of anomalous resources; and
   causing display, on a computing device, of an interface comprising the set of anomalous resources and the set of anomalous events.

2. The method of claim 1, wherein the plurality of events comprises at least one of a login attempt, a button click, a form action, or an application flow.

3. The method of claim 1, wherein the statistical representations are based on event-level features comprising at least one of a categorical feature, a textual feature, or a numerical feature.

4. The method of claim 1, wherein the trained anomaly detector identifies the set of anomalous resources based on a minimum event threshold.

5. The method of claim 1, wherein the statistical representations are resource-level representations based on summaries of a plurality of features associated with the plurality of events corresponding to the plurality of resources.

6. The method of claim 1, wherein the plurality of events are received as a stream of events.

7. The method of claim 1, further comprising:
   causing a server system to limit a number of events received by the set of anomalous resources.

8. The method of claim 1, wherein identifying the set of anomalous events comprises:
   determining distances between each of the plurality of events of the set of anomalous resources;
   computing an event proximity based on the distances;
   producing clusters of suspected events that are similar based on the event proximity; and
   extracting the clusters of suspected events, wherein each of the suspected events is an anomalous event.

9. The method of claim 8, wherein computing the event proximity based on the distances comprises:
   determining a weight for each of the distances; and
   producing clusters of suspected events that are similar based on the weight.

10. A system comprising:
a memory that stores instructions; and
a processor configured by the instructions to perform operations comprising:
receiving, by a processor, a plurality of events associated with a plurality of resources;
computing, in real-time, statistical representations for each resource associated with at least one of the plurality of events;
generating a reference window comprising a first portion of the plurality of events and a current window comprising a second portion of the plurality of events;
training an anomaly detector on the reference window using the statistical representations of resources in the first portion of the plurality of events;
evaluating, by the trained anomaly detector, the current window using the statistical representations of resources in the second portion of the plurality of events to identify a set of anomalous resources;
identifying a set of anomalous events associated with the set of anomalous resources; and
causing display, on a computing device, of an interface comprising the set of anomalous resources and the set of anomalous events.

11. The system of claim 10, wherein the plurality of events comprises at least one of a login attempt, a button click, a form action, or an application flow.

12. The system of claim 10, wherein the statistical representations are based on event-level features comprising at least one of a categorical feature, a textual feature, or a numerical feature.

13. The system of claim 10, wherein the trained anomaly detector identifies the set of anomalous resources based on a minimum event threshold.

14. The system of claim 10, wherein the statistical representations are resource-level representations based on summaries of a plurality of features associated with the plurality of events corresponding to the plurality of resources.

15. The system of claim 10, wherein the plurality of events are received as a stream of events.

16. The system of claim 10, the operations further comprising:
causing a server system to limit a number of events received by the set of anomalous resources.

17. The system of claim 10, wherein identifying the set of anomalous events comprises:
determining distances between each of the plurality of events of the set of anomalous resources;
computing an event proximity based on the distances;
producing clusters of suspected events that are similar based on the event proximity; and
extracting the clusters of suspected events, wherein each of the suspected events is an anomalous event.

18. The system of claim 17, wherein computing the event proximity based on the distances comprises:
determining a weight for each of the distances; and
producing clusters of suspected events that are similar based on the weight.

19. A non-transitory processor-readable storage medium storing processor-executable instructions that, when executed by a processor of a machine, cause the machine to perform operations comprising:
receiving, by a processor, a plurality of events associated with a plurality of resources;
computing, in real-time, statistical representations for each resource associated with at least one of the plurality of events;
generating a reference window comprising a first portion of the plurality of events and a current window comprising a second portion of the plurality of events;
training an anomaly detector on the reference window using the statistical representations of resources in the first portion of the plurality of events;
evaluating, by the trained anomaly detector, the current window using the statistical representations of resources in the second portion of the plurality of events to identify a set of anomalous resources;
identifying a set of anomalous events associated with the set of anomalous resources; and
causing display, on a computing device, of an interface comprising the set of anomalous resources and the set of anomalous events.

20. The non-transitory processor-readable storage medium of claim 19, wherein identifying the set of anomalous events comprises:
determining distances between each of the plurality of events of the set of anomalous set of resources;
computing an event proximity based on the distances;
producing clusters of suspected events that are similar based on the event proximity; and
extracting the clusters of suspected events, wherein each of the suspected events is an anomalous event.

* * * * *